(12) United States Patent
Garcia et al.

(10) Patent No.: US 9,242,726 B2
(45) Date of Patent: Jan. 26, 2016

(54) METHOD FOR POWERING AUTONOMOUS DRIVE MOTORS FOR AN AIRCRAFT

(75) Inventors: Jean-Pierre Garcia, Colomiers (FR);
Florent Nierlich, La Garenne-Colombes (FR); Olivier Gosselin, Paris (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 13/474,813

(22) Filed: May 18, 2012

(65) Prior Publication Data

US 2012/0292437 A1    Nov. 22, 2012

(30) Foreign Application Priority Data

May 20, 2011    (FR) ...................................... 11 54444

(51) Int. Cl.
*B64C 25/50*    (2006.01)
*B64C 25/40*    (2006.01)

(52) U.S. Cl.
CPC ............. *B64C 25/405* (2013.01); *Y02T 50/823* (2013.01)

(58) Field of Classification Search
USPC ................. 244/103 R, 111, 110 A, 100 R, 50
See application file for complete search history.

(56) References Cited

U.S. PATENT DOCUMENTS

| | | | | |
|---|---|---|---|---|
| 3,807,664 A * | 4/1974 | Kelly et al. | ..................... | 244/50 |
| 3,874,619 A * | 4/1975 | Collins et al. | ................... | 244/50 |
| 4,221,350 A * | 9/1980 | Moser et al. | ..................... | 244/50 |
| 7,014,146 B2 * | 3/2006 | Villaume et al. | .............. | 244/111 |
| 7,369,922 B2 * | 5/2008 | Garcia | ............................. | 701/16 |
| 7,445,178 B2 * | 11/2008 | McCoskey et al. | ............. | 244/50 |
| 7,891,609 B2 * | 2/2011 | Cox et al. | ....................... | 244/121 |
| 7,975,960 B2 * | 7/2011 | Cox et al. | ......................... | 244/50 |
| 2006/0065779 A1 | 3/2006 | McCoskey et al. | | |
| 2011/0290933 A1 * | 12/2011 | Cros et al. | ....................... | 244/50 |

FOREIGN PATENT DOCUMENTS

WO    95/29094 A1    11/1995
WO    2009/086804 A1    7/2009

OTHER PUBLICATIONS

French Preliminary Search Report of FR 1154444 dated Dec. 14, 2011.

* cited by examiner

*Primary Examiner* — Timothy D Collins
*Assistant Examiner* — Keith L Dixon
(74) *Attorney, Agent, or Firm* — Sughrue Mion, PLLC

(57) ABSTRACT

A method for powering an autonomous drive device (4) in an aircraft comprising a certain number of drive motors (5) for the wheels (6) when the jet engines of the aircraft are not activated, the aircraft comprising an auxiliary power unit or APU (2) driving a first generator (1) for supplying power to devices on the aircraft that need to be powered when the jet engines are not activated. The method comprises the use of a second generator (8) dedicated to the power supply of the autonomous drive device, the second generator being disposed in parallel with the first generator so as to be driven by the APU and, when it operates as a motor under the action of power recovered by the autonomous drive device, so as to help the APU drive at least the first generator.

4 Claims, 1 Drawing Sheet

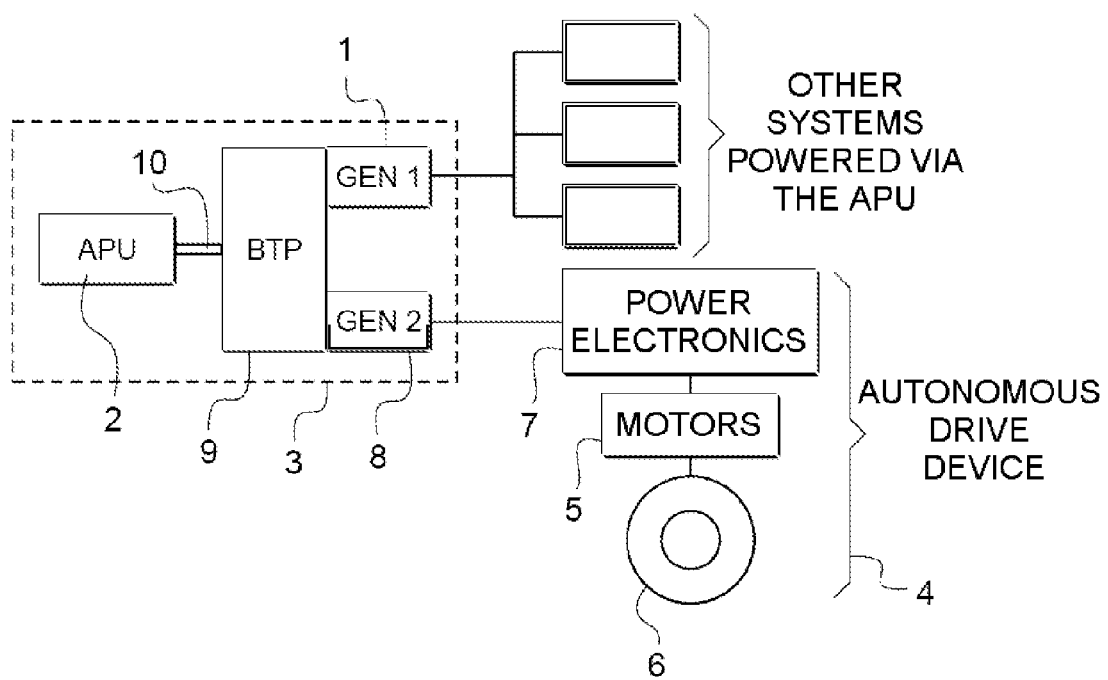

METHOD FOR POWERING AUTONOMOUS DRIVE MOTORS FOR AN AIRCRAFT

The invention relates to a method for powering autonomous drive motors in aircraft, notably in taxiing situations on the ground while the jet engines of the aircraft are inactive.

It is increasingly being envisaged to equip aircraft with an autonomous drive device allowing aircraft to be moved without the assistance of a tractor while the jet engines of the aircraft are not in operation. For this purpose, the wheels of at least some of the landing gear of the aircraft are equipped with motors allowing the wheels in question to be driven, and hence the aircraft to be moved. In these phases, the autonomous drive motors are powered by a generator driven by the auxiliary power unit (or APU), which is a thermal machine started up when the jet engines of the aircraft are not activated.

However, the generator of the APU is designed to be able to ensure the supply of power to the most power consuming of the devices connected to the APU, in the present case the autonomous drive device. In order to power the other devices connected to the APU (the cabin electricity, the cabin air conditioning, the avionics, etc.), converters must be used in order to adapt the electrical power supplied by the generator to these devices with lower power consumption.

In certain situations, the motors of the autonomous drive device are capable of operating as generators, for example in situations where the speed of the aircraft must be decreased. The energy thus generated is then re-injected into the electrical power distribution system for the motors. This energy can then be stored in batteries or capacitors or evacuated by Joule heating in resistors. However, these devices represent a significant mass penalty.

The object of the invention is to provide an optimized method for powering autonomous drive motors, together with an APU/electrical generation assembly for applying it.

With a view to achieving this aim, a method is provided for powering an autonomous drive device for aircraft comprising a certain number of drive motors for the wheels for selectively driving the said wheels at least when the jet engines of the aircraft are not activated, the aircraft comprising an auxiliary power unit or APU driving a first generator for supplying power to the devices on the aircraft that need to be powered when its jet engines are not activated. According to the invention, the method comprises the use of a second generator dedicated to the power supply of the autonomous drive device, the second generator being disposed in parallel with the first generator so as to be driven by the APU and, when it operates as a motor under the action of power recovered by the autonomous drive device, so as to help the APU to drive at least the first generator.

Thus, the second generator can be precisely designed for the requirements of the autonomous drive device. Furthermore, rather than storing the energy recovered by the autonomous drive device, this energy is used to assist the APU and thus decrease the fuel consumption of the latter.

According to one particular aspect of the invention, the method comprises the step for controlling the speed of the aircraft over the ground by powering the autonomous drive motors in order to accelerate the aircraft up to a requested speed if the speed of the aircraft is lower than the said requested speed, and conversely, to make the motors operate as generators in order to slow down the aircraft until the said requested speed is reached if the speed of the aircraft is higher than the said requested speed, the power recovered by the motors then being fed back to the second generator. Such a method can be implemented by the power electronics that manage the power supplied to the autonomous drive motors.

A further subject of the invention is a power generation assembly for applying the method comprising:
an auxiliary power unit of the thermal type or APU;
a gearbox having an input shaft driven by the APU;
first and second generators driven by the gearbox;
the gearbox being configured, when the second generator operates as a motor, for transmitting a transmission of mechanical power from the second generator at least to the first generator.

BRIEF DESCRIPTION OF THE FIGURE

The invention will be better understood in the light of the description that follows of the single FIGURE illustrating, schematically, one particular embodiment of the invention.

An aircraft comprises several devices or systems that can or must be powered while the jet engines of the aircraft are not active. These can for example be the air conditioning system, the cabin lighting, external position lights, etc. It should be noted than none of these systems is capable of returning electrical power, since they do not normally operate as a motor.

One known solution is to power these systems by means of a generator 1 driven by a thermal machine running by means of the fuel onboard the aircraft, in the present case an auxiliary power unit or APU 2. The assembly forms a power generation unit 3 capable of supplying the consumer systems with electrical power. It is well known that the APU can drive other accessories, such as an air compressor, a hydraulic pump, etc.

The addition of an autonomous drive device 4 leads to the installation on the aircraft of an additional consumer system capable of demanding electrical power when the jet engines of the aircraft are inactive. This autonomous drive device essentially comprises motors 5 disposed for driving wheels 6 of the aircraft in order to move the latter around the airport. The motors are powered by a power electronic system 7 allowing the electrical power supplied to the motors to be regulated depending on the desired acceleration or speed.

According to the invention, the electrical power required for the operation of the autonomous drive device 4 is supplied by a second dedicated generator 8 and also driven by the APU 2. More precisely, the APU 2 is coupled to a main gearbox (BTP) 9 allowing a drive shaft 10 from the APU 2 to drive, simultaneously and in parallel, the generators 1 and 8. The power generation unit 3 thus comprises at least two electrical generators, one of which is dedicated to the power supply of the autonomous drive device.

This disposition offers various advantages:
each of the generators can be designed according to the needs of the consumer system or systems associated with it. By way of example, for an aircraft of the AIRBUS A320 type, the first generator 1 will be designed to supply a power of around 30 kVA, whereas the second generator 8 will be designed to supply a power of around 90 to 140 kVA.
When the autonomous drive device operates as a generator, for example when the aircraft slows down while the motors 5 are engaged with the wheels 6, the electrical energy thus produced is fed back via the power electronics 7 to the second generator 8 which then operates as a motor. The latter then generates mechanical energy which is transmitted via the main gearbox 9 to drive the generator 1, relieving the APU 2 of the same amount of energy which thus sees its fuel consumption decrease. It should be noted that if the APU drives other accessories, such as an air compressor or a hydraulic pump, these will also benefit from this recovery of energy transformed into mechanical energy by the second generator 8.

The motors 5 of the autonomous drive device may then be purposely used to slow down the aircraft, thus saving the friction brake discs. The energy thus recovered is then used to relieve the APU 2. Thus, it becomes possible to control the speed of the aircraft over the ground according to the following scenario: the autonomous drive motors are powered to make the aircraft accelerate up to a given requested speed if the speed of the aircraft is lower than the said requested speed, and conversely, the autonomous drive motors are used as a generator to slow the aircraft down to the said requested speed if the speed of the aircraft is higher than the said requested speed, the energy returned by the motors being recovered and fed back to the second generator, as explained previously. Such a method can be implemented by the power electronics that manage the power supplied to the motors. The requested speed can be generated by an onboard computer controlling the movement of the aircraft on the ground, or be generated in response to the operation by the pilot of a lever or other control device.

The invention is not limited to what has just been described, but on the contrary encompasses all variants coming within the scope defined by the claims. In particular, devices for coupling/decoupling between the generators and the main gearbox could be provided. The main gearbox could also drive other accessories, such as for example a pump.

Furthermore, although the main gearbox is traditionally of the type with pinions, any other type of transmission could be used, such as for example an electromagnetic transmission, as long as the mechanical power that the second generator is able to develop when it receives the electrical power returned by the autonomous drive device can be transmitted and used to drive the first generator, thus relieving the APU.

The invention claimed is:

1. A method for powering an autonomous drive device (4) in an aircraft comprising a plurality of drive motors (5) for selectively driving wheels (6) at least when jet engines of the aircraft are not activated, the aircraft comprising an auxiliary power unit (APU) (2) driving a first generator (1) for supplying electric power to electrical devices on the aircraft that need to be powered when the jet engines are not activated, the method comprising:

using a second generator (8) exclusively dedicated to the electric power supply of the autonomous drive device,
using a gearbox coupled to the APU and to the first and second generators so that the first and second generators are disposed in parallel, the gearbox being adapted to transmit mechanical power from the APU to the first and second generators so that the first and second generators can be driven in parallel by the APU, and
using the gearbox to transmit mechanical power from the second generator to the first generator when the second generator operates as a motor under the action of power recovered by the autonomous drive device, so as to assist the APU to drive at least the first generator.

2. The method according to claim 1, comprising controlling the speed of the aircraft over the ground by:

powering the autonomous drive motors in order to accelerate the aircraft up to a requested speed if an actual speed of the aircraft is lower than the said requested speed, and
conversely, operating the motors as generators in order to slow down the aircraft until the requested speed is reached if the actual speed of the aircraft is higher than the requested speed,
wherein power recovered by the motors is fed back to the second generator.

3. A power generation assembly for an aircraft comprising:
an auxiliary power unit (APU) (2) capable of delivering a mechanical power;
a main gearbox (9) driven by a drive shaft coming from the APU;
an autonomous drive device (4) comprising a plurality of drive electric motors (5) for selectively driving wheels (6) of the aircraft;
at least first and second generators (1, 8);
wherein said first generator (1) supplies electric power to devices on the aircraft that need to be powered when jet engines of the aircraft are not activated;
wherein said second generator (8) is exclusively dedicated to supplying electric power to the autonomous drive device so as to drive the electric motors (5) for selectively driving wheels (6) of the aircraft;
wherein said first and second generators (1, 8) are mechanically coupled to the main gearbox,
wherein the main gearbox is adapted to transmit mechanical power from the APU to the first and second generators so that the first and second generators can be driven in parallel by the APU; and
wherein the main gearbox is further configured, when the second generator operates as a motor, for transmitting a transmission of mechanical power from the second generator to at least the first generator, so as to assist the APU to drive at least the first generator.

4. A method for powering an autonomous drive device (4) in an aircraft comprising a plurality of drive motors (5) for selectively driving wheels (6) at least when jet engines of the aircraft are not activated, the aircraft comprising an auxiliary power unit (APU) (2) driving a first generator (1) for supplying electric power to electrical devices on the aircraft that need to be powered when the jet engines are not activated, the method comprising:

using a second generator (8) dedicated to the electric power supply of the autonomous drive device,
using a gearbox mechanically coupled to the APU and to the first and second generators so that the first and second generators are disposed in parallel, the gearbox being adapted to transmit mechanical power from the APU to the first and second generators so that the first and second generators can be driven in parallel by the APU, and
using the gearbox to transmit mechanical power from the second generator to the first generator when the second generator operates as a motor under the action of power recovered by the autonomous drive device, so as to assist the APU to drive at least the first generator.

* * * * *